United States Patent [19]
Falkner

[11] Patent Number: 6,080,306
[45] Date of Patent: Jun. 27, 2000

[54] HYDROGEN SULFIDE REMOVAL APPARATUS

[76] Inventor: Kemp E Falkner, 3888 N. Ponce De Leon, St Augustine, Fla. 32084

[21] Appl. No.: 09/089,282

[22] Filed: Jun. 2, 1998

[51] Int. Cl.[7] .................................................. C02F 1/74
[52] U.S. Cl. ........................ 210/123; 210/205; 210/519; 261/76; 261/DIG. 75
[58] Field of Search .................................. 210/205, 207, 210/123, 513, 519, 916; 261/76, DIG. 75; 422/105, 306; 423/563

[56] References Cited

U.S. PATENT DOCUMENTS

| | | | |
|---|---|---|---|
| 3,387,431 | 6/1968 | Siebert | 55/51 |
| 3,957,638 | 5/1976 | In't Veld | 210/123 |
| 3,984,316 | 10/1976 | Worrall et al. | 210/59 |
| 4,402,713 | 9/1983 | Domahidy | 55/53 |
| 4,412,924 | 11/1983 | Feather | 210/744 |
| 4,766,001 | 8/1988 | Mizandjian et al. | 261/DIG. 75 |
| 4,885,084 | 12/1989 | Doyle | 261/DIG. 75 |
| 5,035,810 | 7/1991 | Heisel et al. | 210/750 |
| 5,073,310 | 12/1991 | Ramsey | 261/76 |
| 5,340,484 | 8/1994 | Prince et al. | 210/712 |
| 5,525,242 | 6/1996 | Kerecz | 210/758 |

*Primary Examiner*—David A. Simmons
*Assistant Examiner*—Frank M. Lawrence
*Attorney, Agent, or Firm*—Charles M. Kaplan

[57] ABSTRACT

Hydrogen sulfide is removed from water by methods and apparatus that cause sufficient oxygen to be dissolved in the water for sufficient time at sufficient pressure to precipitate out solid elemental sulfur and other solid sulfur particles.

21 Claims, 3 Drawing Sheets

HYDROGEN SULFIDE REMOVAL APPARATUS

BACKGROUND OF THE INVENTION

This invention relates to the purification of water, and more particularly to the removal of hydrogen sulfide dissolved in potable water. Some prior hydrogen sulfide removal systems have discharged hydrogen sulfide gas into a building or home, while others have used aerators that required long treatment times and storage of treated water for prolonged periods of time to provide an adequate supply. Such prolonged storage of the treated water exposes it to contamination. Other hydrogen sulfide removal systems have required additional downstream treatment media. Such systems have used treatment media that are short lived or require noxious chemical for regeneration.

OBJECTIVES OF THE INVENTION

Accordingly, it is an object of this invention to provide improved methods and apparatus from removing hydrogen sulfide from water.

Another object is to provide portable hydrogen sulfide removal equipment that can be assembled in a factory and shipped as an integral unit to a home or business where it can be connected into an existing water supply system with common plumber tools.

An additional object is to provide environmentally clean methods and apparatus for removing hydrogen sulfide from water that do not discharge hydrogen sulfide gas into the atmosphere.

Another object is to provide hydrogen sulfide removal methods and apparatus that have high liquid flow through capacity, but do not require prolonged storage of treated liquid.

Another object is to provide air injection hydrogen sulfide removal apparatus that prevents short cycling of the system pressure supply pump.

A still further object is remove hydrogen sulfide from water without using any chemical other than oxygen from ambient air.

Another object is to safely precipitate hydrogen sulfide out of potable water as elemental sulfur and other solid sulfur particles under variable conditions and flow rates and at ambient temperatures and at water pressures commonly encountered in residential and business structures.

A further object is to provide methods and apparatus for removing hydrogen sulfide from water by injecting air into the water that are durable, relatively economical, easy to install and repair, and which do not possess defects found in similar prior art water treatment systems.

Other objects and advantages of the methods and apparatus incorporating this invention will be found in the specification and claim and the scope of the invention will be set forth in the claims.

DESCRIPTION OF THE INVENTION

Figure 1:
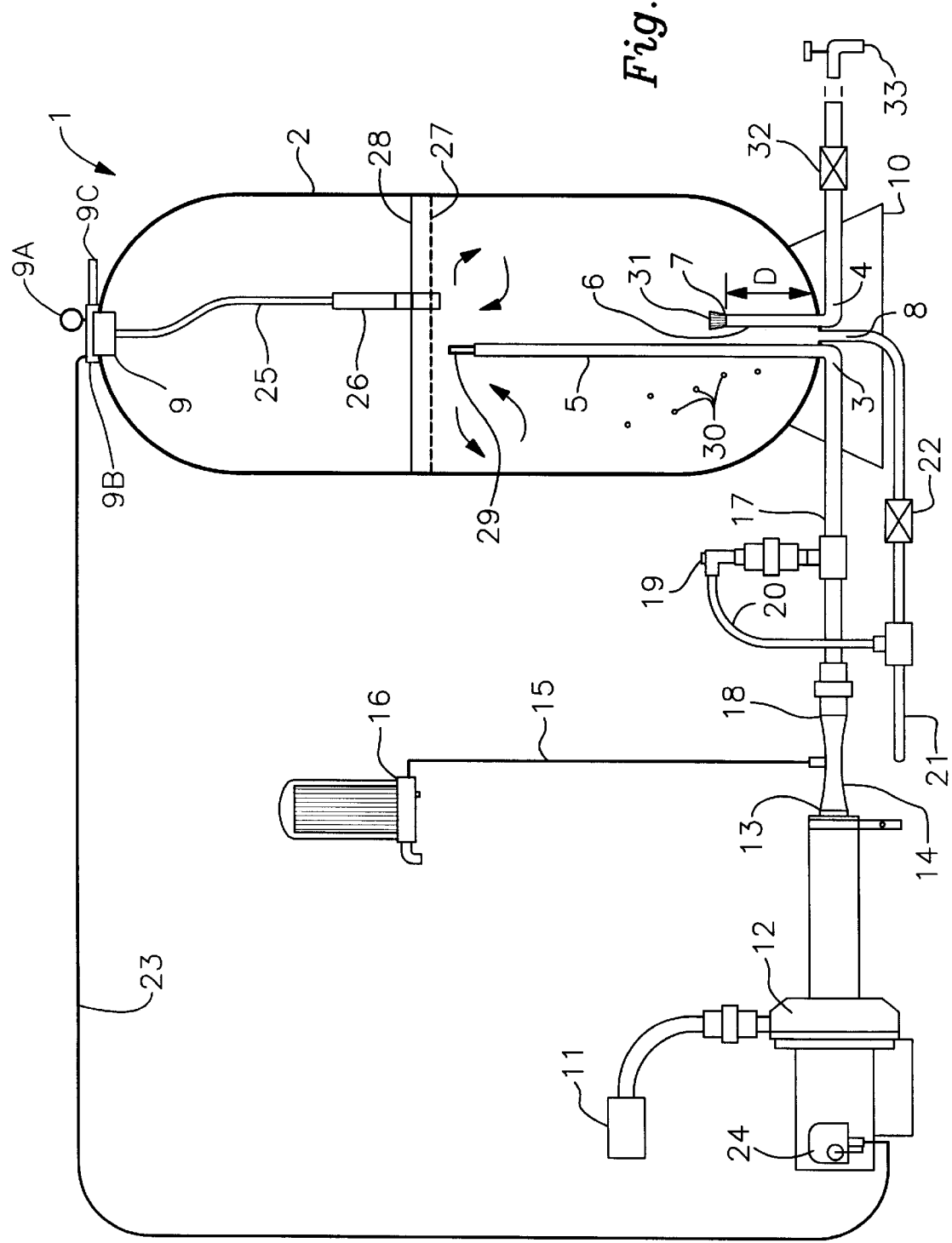
FIG. 1 is a schematic, partially cross-sectional, representation of an embodiment of liquid treatment apparatus incorporating the invention.

FIG. 1 of the drawing shows an embodiment of apparatus 1 in accord with this invention for precipitating all of the sulfur out of potable water containing hydrogen sulfide in an intermittent or variable rate flow system. A pressurized fiberglass vessel or tank 2 that is opaque and closed to the atmosphere has an inlet 3 for water containing hydrogen sulfide an outlet 4 for water that is free of hydrogen sulfide. Sunlight must not be allowed to illuminate the interior of the tank, and the high levels of oxygen do not react with fiberglass as they would with a metal tank. As used herein, the words vessel and tank are also intended to include two or more liquid containers that have been connected in series or in parallel to provide enough liquid volume to attain the minimum detention times described below that are required for the hydrogen sulfide concentrations being treated and the effective treated liquid exit flow demands of the systems.

The untreated water inlet 3 may be connected through the bottom of the tank to an inlet riser 5 that extends upwardly to about the center of the tank; or the inlet 3 may also be connected at the top or the side of the tank. The outlet 4 is connected to an open-ended outlet riser 6 that has its entrance opening 7 that is a substantial distance D above the bottom of the tank. There is a drain hole 8 at the bottom of the tank 2 that is spaced vertically by the distance D from the opening 7. The outlet 4 also may be through the top or side of the tank, but the entrance opening 7 must always be spaced at least the distance D above the tank drain hole 8. At the top of tank 2, a tank adaptor 9 that includes a pressure gage 9a, an air control line connector 9b and a surplus air vent pipe 9c is located above the highest level that is ever reached by the water in the tank. A stand 10 supports the tank.

A flow of pressurized incoming potable water from a well pump, artesian source, or municipal supply enters the apparatus 1 through a check valve 11, and flows through an electrically operated booster pump 12. The pump raises the pressure of the system to a level that ensures that all of the sulfur will precipitate out of the incoming water as solid elemental sulfur particles. The pressurized water is fed by the pump 12 into the inlet 13 of a venturi injector nozzle 14. Ambient air is drawn into the nozzle 14 through an air line 15 after being filtered and treated to remove bacteria in an air purifier 16.

The pressurized air-water mixture flows to inlet 3 through a line 17 that is connected at one end to the outlet 18 of the nozzle 14. Ambient air can also be injected into line 17 by conventional electrically powered motorized blowers or air compressors of suitable size. Also, if required by high concentrations of hydrogen sulfide, pure oxygen gas by itself can be injected into line 17, or the oxygen can be added to the incoming air. A pressure relief valve 19 down stream from nozzle 14 connects line 17 through a line 20 to a waste line 21. Waste line 21 is connected to drain hole 8 through a purge ball valve 22 that opens the drain to cause liquid flow that washes out or flushes precipitated solid sulfur particles and crystals from the bottom of tank 2.

The pressure inside of tank 2 is controlled by an electrically operated pressure switch 24 at pump 12 that is connected to a pressure control line 23. Control line 23 is connected to the top of tank 2 through air line connector 9b. Air vent pipe 9c is connected to an offset drop pipe 25 that extends downwardly into a float actuated ballast vent valve 26 located near the center of tank 2. Accumulated compressed air in the top part of tank 2 lowers the liquid in the tank to the level 27, at which level the float in valve 26 opens the valve and releases air to the atmosphere through drop pipe 25 and vent pipe 9c. This enables the liquid to rise to level 28 where the float closes valve 26. Continually accumulating and releasing surplus air in the upper part of tank 2 will ensure that the liquid level does not rise above the valve 26. The volume of air accumulated must permit a draw down (e.g. five gallons) of the liquid in tank 2 that prevents short cycling of the pump 12. The greater the flow capacity of the pump 12, the greater the volume of air that should be compressed in the top part of tank 2 to prevent pump short cycling. Pipe 25 is vertically offset from inlet riser 5 to prevent eddies and currents in the tank incoming water supply from affecting the action of vent valve 26. The air vented from tank 2 will be free from hydrogen sulfide gas.

The volume of the liquid in tank 2 below the level 27 should be determined from the minimum detention times required for various hydrogen sulfide concentrations disclosed below. The tank liquid volume is also determined by the effective flow rate of treated liquid out of the apparatus through outlet 4, which is based on the demand pattern of the treated water user. The volume of tank 2 should also be large enough to avoid expelling a large amount of air into the downstream treated water supply if there is an electrical power failure.

A liquid diffuser 29 at the top of inlet riser 5 distributes the incoming water-air mixture outwardly from the center of the tank towards the circumference in a 360° slow stream approximately at the level 27. As indicated by the arrows, this creates a turbulent mixing zone in the upper portion of the water in tank 2 where the incoming contaminated water flow is mixed with the water that is already in the tank. This mixing promotes the precipitation of solid elemental and other solid sulfur particles 30. The turbulence in the water gradually subsides as the water and the precipitated solid sulfur particles 30 flow downwardly toward the outlet opening 7. Below the opening 7, the distance D that spaces the opening 7 above the drain hole 8 must be vertically long enough to create a quiescent non-turbulent liquid movement zone so that the precipitated sulfur particles 30 will settle or fall downwardly through the non-turbulent zone on to the tank bottom and into the drain hole 8. A coarse strainer 31 on the top of outlet riser 6 prevents particles of precipitated sulfur from entering the outlet 4 and flowing out with the treated water.

An outlet valve 32 can be used to shut off or to control the amount of treated water flowing out of tank 2. Potable water free from hydrogen sulfide can be obtained from any of the user's downstream taps 33 without the necessity of further treatment. However, the practice of this invention does not prevent the treatment of the water upstream from inlet 3 and/or downstream from outlet 4 by other operations such as softening to remove hardness ions, or the removal of iron or other impurities.

Figure 2:
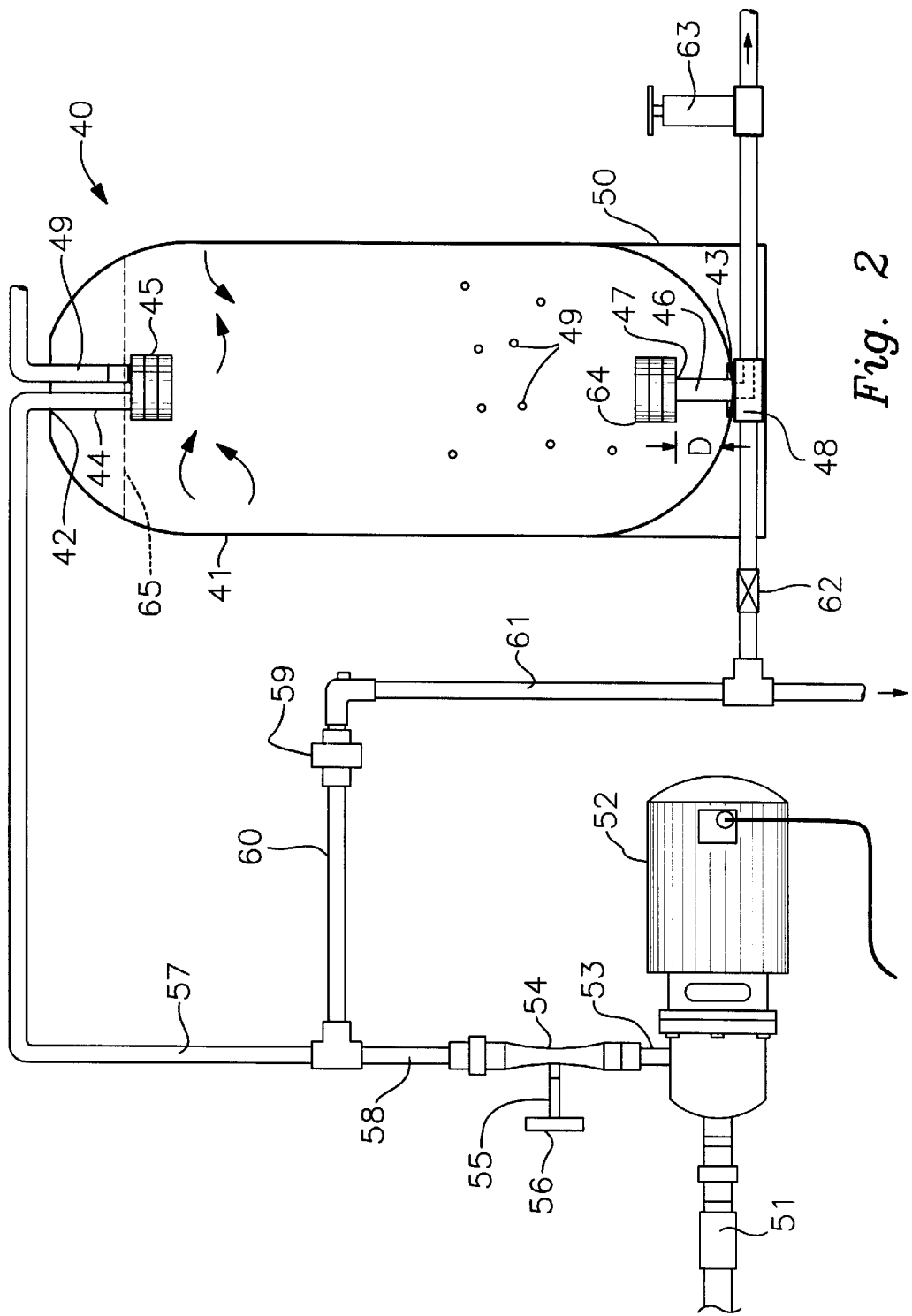
FIG. 2 is a schematic, partially cross-sectional, representation of another embodiment of liquid treatment apparatus incorporating the invention.

FIG. 2 of the drawing shows another embodiment of apparatus 40 in accord with this invention for precipitating all of the sulfur out of water containing hydrogen sulfide in a continuous flow system. A pressurized fiberglass vessel or tank 41 that is opaque and closed to the atmosphere has an inlet 42 for water containing hydrogen sulfide at the top of the tank, and an outlet 43 for water that is free of hydrogen sulfide. The untreated water inlet 42 may be connected through the top of the tank to a downwardly extending drop pipe 44 that has a liquid flow diffuser 45 at its lower end. The outlet 43 is connected to an open-ended outlet riser 46 that has its entrance opening 47 that is a substantial distance D above the bottom of the tank. There is a drain hole 48 at the bottom of tank 41 that is spaced vertically by the distance D below the opening 47. The outlet 43 also may be through the side of the tank, but the entrance opening 47 must always be spaced at least the distance D above the tank drain hole 48. To control the level of the water in the tank a vent float valve 49 similar in operation to the valve 26 is located near the top of the tank 41. A stand 50 supports the tank.

A continuous flow of pressurized incoming water from a well pump, artesian source, or municipal supply enters the apparatus 40 through a check valve 51, and flows through an electrically operated booster pump 52 where the pressure of the system is raised to a level that ensures that all of the sulfur will precipitate out of the incoming water. The pressurized water is fed by the pump 52 into the inlet 53 of a venturi injector nozzle 54. Ambient air is drawn into the nozzle 54 through an air line 55 after being filtered and treated to remove bacteria in an air purifier 56.

The pressurized air-water mixture flows to inlet 42 through a line 57 that is connected at one end to the outlet 58 of the nozzle 54. Ambient air can also be injected into line 57 by conventional electrically powered blowers or air compressors of suitable size. A pressure relief valve 59 down stream from nozzle 54 connects line 57 through a line 60 to a waste line 61. Waste line 61 is connected to drain hole 48 through a purge ball valve 62 that opens the drain hole to cause liquid flow that washes out or flushes precipitated sulfur particles and crystals from the inside of tank 41. Air released from the top of tank 41 through valve 49 will not contain hydrogen sulfide.

The pressure inside of tank 41 is controlled back pressure control valve 63 that is connected downstream from outlet 43; valve 63 is set to open just below the pressure set for pressure relief valve 59 (e.g.73 psi for valve 63 and 75 psi for valve 59 ). Back pressure control valve 63 is set to close when the pressure in tank 41 falls to a predetermined safe minimum pressure that must be maintained at all times to ensure precipitation of solid elemental sulfur particles in the tank (e.g. 60 psi).

The volume of the liquid stored in tank 41 should be determined by the minimum detention time required for various hydrogen sulfide concentrations given below and by the liquid flow rate through the apparatus. The liquid diffuser 45 at the bottom of down pipe 44 distributes the incoming water-air mixture outwardly from the center of the tank towards the circumference in a 360° slow stream near the upper surface 65 of the liquid. As indicated by the arrows, this creates a turbulent mixing zone in the upper portion of the water in tank 41 where the incoming contaminated water flow is mixed with the water that is already in the tank 41. This mixing promotes the precipitation of solid sulfur particles 49. The turbulence in the water gradually subsides as the water and the precipitated sulfur particles 49 flow downwardly toward the outlet opening 47. Below the opening 47, the distance D that spaces the opening 47 above the drain hole 48 must be vertically long enough to create a quiescent non-turbulent liquid movement zone so that the precipitated sulfur particles 49 will settle or fall downwardly through the non-turbulent zone on to the tank bottom and into the drain hole 48. A coarse strainer 64 on the top of outlet riser 46 prevents particles of precipitated sulfur from entering the outlet and flowing out with the treated water.

A continuous flow of water that is free from hydrogen sulfide will be provided downstream from the outlet 43 without the necessity of further treatment. However, the practice of this invention does not prevent the treatment of the hydrogen sulfide contaminated water upstream from the apparatus and/or the treated water downstream from outlet 43 by other operations such as softening to remove hardness ions, or the removal of iron or other impurities.

Figure 3:
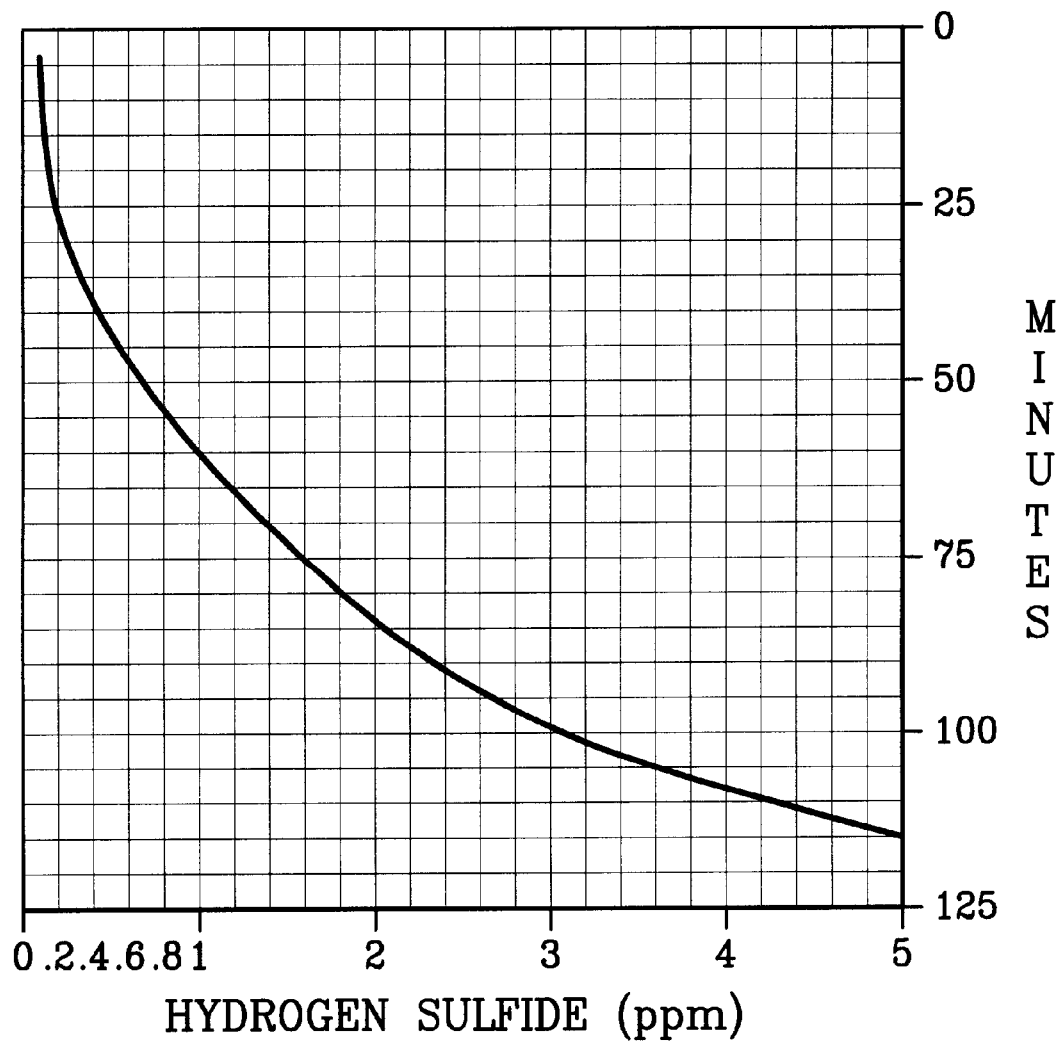
FIG. 3 is a graph of detention time and hydrogen sulfide level.

Sulfur can be precipitated out of potable or non-potable water having a temperature in the range of about 50–80° Fahrenheit (F.) that is contaminated with hydrogen sulfide.

required minimum detention time can be obtained from the curve shown in FIG. 3. The data from the FIG. 3 curve yields the following table of approximate required minimum detention times in minutes for the indicated hydrogen sulfide concentrations:

| H2S (ppm) | Time (min) | H2S (ppm) | Time (min) | H2S (ppm) | Time (min) | H2S (ppm) | Time (min) | H2S (ppm) | Time (min) |
|---|---|---|---|---|---|---|---|---|---|
| 0.0–0.1 | 6 | 1.0–1.1 | 63 | 2.0–2.1 | 86 | 3.0–3.1 | 101 | 4.0–4.1 | 109 |
| 0.1–0.2 | 25 | 1.1–1.2 | 65 | 2.1–2.2 | 87 | 3.1–3.2 | 102 | 4.1–4.2 | 110 |
| 0.2–0.3 | 35 | 1.2–1.3 | 68 | 2.2–2.3 | 88 | 3.2–3.3 | 103 | 4.2–4.3 | 111 |
| 0.3–0.4 | 40 | 1.3–1.4 | 70 | 2.3–2.4 | 90 | 3.3–3.4 | 104 | 4.3–4.4 | 112 |
| 0.4–0.5 | 45 | 1.4–1.5 | 73 | 2.4–2.5 | 92 | 3.4–3.5 | 104 | 4.4–4.5 | 112 |
| 0.5–0.6 | 48 | 1.5–1.6 | 75 | 2.5–2.6 | 94 | 3.5–3.6 | 105 | 4.5–4.6 | 113 |
| 0.6–0.7 | 52 | 1.6–1.7 | 77 | 2.6–2.7 | 95 | 3.6–3.7 | 105 | 4.6–4.7 | 113 |
| 0.7–0.8 | 54 | 1.7–1.8 | 80 | 2.7–2.8 | 97 | 3.7–3.8 | 106 | 4.7–4.8 | 114 |
| 0.8–0.9 | 57 | 1.8–1.9 | 82 | 2.8–2.9 | 98 | 3.8–3.9 | 407 | 4.8–4.9 | 114 |
| 0.9–1.0 | 60 | 1.9–2.0 | 84 | 2.9–3.0 | 100 | 3.9–4.0 | 108 | 4.9–5.0 | 115 |

The water flows either continuously or intermittently at some predetermined effective flow rate that satisfies the user—s demand. The incoming contaminated water will have an initial pressure from a well pump or other source. The incoming pressure must be raised sufficiently by the pumps 11 and 52 to accommodate the pressure drop across the injectors 14 and 54 and then to maintain sufficient pressure in the tanks 2 and 41 for sulfur particles to be precipitated. It has been discovered that when the pressure in tanks 2 and 41 falls to 55 pounds per square inch (psi), the apparatus fails to precipitate sulfur at a rate that ensures adequate treatment results. Therefore the minimum pressure in tanks 2 and 41 must be kept above 55 psi at all times. The upper limit of the pressure in the tanks can be set to any safe level, such as 75 psi. This 20 psi differential is a large enough range to ensure that the tank pressure remains above the 55 psi fail point at the continuous or varying incoming and out going water flows normally encountered in such water systems. The pressure drop across an injector 14 or 54 is typically in the area of about 35 psi, in which case the pumps 11 and 41 would have to raise the pressure to the range of about 90 to 110 psi at the injector inlets 12 and 53 to maintain the minimum 55 psi pressure in the tanks.

To precipitate sulfur, the dissolved oxygen level must not fall below about 6 parts per million (ppm). The dissolved oxygen level was tested by draining water from the tank outlets 4 and 43 into an open container and measuring the oxygen with a Yellow Springs Instrument Co. model 51B portable meter having a #5739 probe; the dissolved oxygen was 6 ppm, which means that the water was saturated with oxygen at atmospheric pressure. The dissolved oxygen level in the tanks 2 and 41 is obviously higher than 6 ppm depending on the pressure in the tank and the temperature of the water.

In order to ensure that sufficient sulfur is precipitated to remove all of the hydrogen sulfide, there is a relatively short, but necessary, minimum detention time for the water-air mixture in the pressurized oxygen-rich tanks 2 and 41. The minimum detention time of the water in tanks 2 and 41 must be long enough to ensure precipitation of essentially all of the sulfur as solid particles, but not so long that contamination can occur. The required detention time is determined by the concentration of hydrogen sulfide in the water. It has been found by empirical testing that for hydrogen sulfide concentrations between 0 and 5 ppm that the approximate The above required minimum detention times are approximations that also may be influenced by the temperature of the water being treated, other chemicals in the water such as iron or hardness ions, pH and the elevation above sea level of the system. The minimum detention time that occurs in any specific tank 2 or 41 may be calculated by dividing the effective exit flow rate at the tank outlets 4 and 43 into the minimum volume of water maintained in the tanks by their liquid level control devices.

In factory-assembled embodiments of the invention that are essentially the same as shown in FIG. 1, a Myers booster pump 12 supplied nine gallons per minute (gpm) of water at 110 psi at the ejector inlet 13. The injector 14 is a Mazzei model 584 injector. At this pressure, the injector 14 has a 35 psi pressure drop and draws 2.5 standard cubic feet of ambient air per hour into the hydrogen sulfide containing water. The air-water mixture flows into different sized tanks 2 that vary in size depending on the required detention time and effective exit flow rate of the treated water. The valves 26 are North American 10734 HP-18AV float valves. The tanks 2 have their control pipes 25 and float valves 26 set to maintain the liquid level 28 so that an air space that would be occupied by forty gallons of water is vacant in the top of each tank. The pressure switch 24, float valve 26 and relief valve 19 are set to keep the pressure in the tanks 2 in the range of 60 to 75 psi. The dissolved oxygen level in the tanks 2 was measured at between 13.2 and 15.0 ppm at temperatures in the range of about 64° F. to 73° F., and at the outlet 4 the dissolved oxygen was always 6 ppm at atmospheric pressure. The dissolved oxygen in the tanks 2 was measured by Yellow Spring Instrument Co. model 51-B portable meter having a #5739 probe that had been inserted into the tank. The vertical distance D that defined the quiescent liquid settling zone for precipitated sulfur particles that extends between the drain hole 8 and the outlet pipe entrance 7 was at least six inches. The turbulent mixing zone for incoming liquid extended at least about 24 inches above the pipe entrance 7.

The factory-assembled FIG. 1 embodiments of the invention described above have been used to completely remove hydrogen sulfide from eight home potable water systems in which the hydrogen sulfide levels ranged from about 0.1 to 5 ppm. In one embodiment, the detention time of the air-water mixture in a tank 2 was calculated as 40 gallons÷about 6 gpm=about 6 minutes, which is sufficient for hydrogen sulfide concentrations up to about 0.1 ppm.

The hydrogen sulfide was precipitated out as solid elemental sulfur and other solid sulfur particles that settled through the quiescent zone to the tank bottom. The settled solid sulfur particles were removed by flushing the particles out of the drain hole 8 by opening valve 22. The treated water flowing out of outlet 4 had no dissolved hydrogen sulfide or sulfur odor or taste, and the air released from the tank 2 by the float valve 26 or relief valve 19 had no sulfur odor. No chemicals other than ambient air were used to treat the hydrogen sulfide containing water.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claim cover all such changes as fall within the true spirit and scope of the invention.

I claim:

1. Apparatus for removing hydrogen sulfide from water by precipitating and settling the sulfur out of the water containing hydrogen sulfide without filtration, comprising:

a pressure vessel having an inlet for the water containing hydrogen sulfide, and an outlet for potable water free of hydrogen sulfide;

means for flowing pressurized water containing hydrogen sulfide into said inlet;

means for injecting sufficient air into said water containing hydrogen sulfide before said water containing hydrogen sulfide enters said inlet to raise the dissolved oxygen level in said water containing hydrogen sulfide to at least about 6 ppm;

means for maintaining said pressure vessel at a pressure that does not fall below about 55 psi;

means for retaining the water containing hydrogen sulfide and dissolved oxygen mixture in said pressure vessel for sufficient time to precipitate the sulfur in said hydrogen as solid sulfur particles in said pressure vessel;

means for settling the precipitated solid sulfur particles downwardly toward the bottom of said pressure vessel;

means for removing the precipitated solid sulfur particles from said pressure vessel at its bottom; and means for discharging potable water that is free of hydrogen sulfide and solid sulfur particles from said pressure vessel through said outlet at a location within said pressure vessel that is spaced from said bottom.

2. The apparatus for precipitating sulfur out of water containing hydrogen sulfide defined in claim 1, further comprising said means for flowing pressurized water being a pump connected to said inlet, and said means for injecting air being a venturi nozzle having its inlet connected to the outlet side of said pump and its outlet connected to said inlet of said pressure vessel.

3. The apparatus for precipitating sulfur out of water containing hydrogen sulfide defined in claim 1, further comprising said means for retaining the water containing hydrogen sulfide and dissolved oxygen mixture in said pressure vessel comprising an air level control valve extending downwardly from the top of said pressure vessel into said pressure vessel so as to expel compressed air from said pressure vessel when the level of the water containing hydrogen sulfide and dissolved oxygen mixture in said pressure vessel falls below a predetermined minimum level.

4. The apparatus for precipitating sulfur out of water containing hydrogen sulfide defined in claim 1, further comprising said means for injecting air causing saturation of the hydrogen sulfide containing water with oxygen.

5. The apparatus for precipitating sulfur out of water containing hydrogen sulfide defined in claim 1, further comprising means for flushing the precipitated particles of sulfur out of said pressure vessel below said outlet at the pressure vessel bottom.

6. The apparatus for precipitating sulfur out of water containing hydrogen sulfide defined in claim 1, further comprising, said pressure vessel being a closed tank having an inlet riser for the water containing hydrogen sulfide and dissolved oxygen mixture connected to said inlet and extending upwardly to about the center of said closed tank and creating a turbulent water mixing zone adjacent the center of said tank where said mixture is discharged into said tank, an outlet riser above the bottom of said tank for discharge of water free of hydrogen sulfide and solid sulfur particles from said outlet, and a drain at the bottom of said tank below said outlet riser for removal of solid sulfur particles that have precipitated in said tank through said drain, said outlet riser being spaced above said drain a distance that is sufficient to create a quiescent non-turbulent liquid zone in said tank through which precipitated solid particles of sulfur settle toward said drain.

7. The apparatus for precipitating sulfur out of water containing hydrogen sulfide defined in claim 6, further comprising said means for flowing pressurized water being a pump, said means for injecting air being a venturi nozzle having its liquid inlet connected to the outlet of said pump and its outlet connected to said inlet riser of said closed tank, and said means for retaining the water containing hydrogen sulfide and dissolved oxygen mixture in said closed tank comprises an air level control valve extending downwardly from the top of said pressure vessel into said closed tank so as to expel compressed air from said tank when the level of the water containing hydrogen sulfide and dissolved oxygen mixture in said tank falls below a predetermined minimum level.

8. The apparatus for precipitating sulfur out of water containing hydrogen sulfide defined in claim 6, further comprising said means for flowing pressurized water being a pump, said means for injecting air being a venturi nozzle having its liquid inlet connected to the outlet of said pump and its outlet connected to said inlet riser of said closed tank, said pump and venturi nozzle injecting sufficient air to saturate said hydrogen sulfide containing water with oxygen, and said means for retaining the water containing hydrogen sulfide and dissolved oxygen mixture in said closed tank comprises an air level float control valve extending downwardly from the top of said closed tank into said closed tank so as to expel compressed air from said closed tank when the level of the water containing hydrogen sulfide and dissolved oxygen mixture in said closed tank falls below a predetermined minimum level, and said inlet riser and said air level control valve being vertically offset from each other adjacent the center of said closed tank.

9. The apparatus for precipitating sulfur out of water containing hydrogen sulfide defined in claim 1, further comprising a drain hole in the bottom of said pressure vessel, an inlet distributor for creating a turbulent liquid zone in which incoming hydrogen sulfide containing water and air are mixed with liquid already in said pressure vessel, said inlet distributor being located above said drain hole, and a treated water outlet located between said drain hole and said inlet distributor, said treated water outlet being spaced vertically above said drain hole a distance that is sufficient to create a quiescent non-turbulent liquid zone between said treated water outlet and said drain hole that enables precipitated sulfur particles to settle downwardly through said quiescent non-turbulent liquid zone toward said drain hole.

10. The apparatus for precipitating sulfur out of water containing hydrogen sulfide defined in claim 1, wherein said means for retaining the water containing hydrogen sulfide and dissolved oxygen mixture in said pressure vessel comprises means for retaining said mixture in said pressure vessel for at least about a minimum period of time selected from the following table for the indicated hydrogen sulfide levels:

| H2S (ppm) | Time (min) | H2S (ppm) | Time (min) | H2S (ppm) | Time (min) | H2S (ppm) | Time (min) | H2S (ppm) | Time (min) |
|---|---|---|---|---|---|---|---|---|---|
| 0.0–0.1 | 6 | 1.0–1.1 | 63 | 2.0–2.1 | 86 | 3.0–3.1 | 101 | 4.0–4.1 | 109 |
| 0.1–0.2 | 25 | 1.1–1.2 | 65 | 2.1–2.2 | 87 | 3.1–3.2 | 102 | 4.1–4.2 | 110 |
| 0.2–0.3 | 35 | 1.2–1.3 | 68 | 2.2–2.3 | 88 | 3.2–3.3 | 103 | 4.2–4.3 | 111 |
| 0.3–0.4 | 40 | 1.3–1.4 | 70 | 2.3–2.4 | 90 | 3.3–3.4 | 104 | 4.3–4.4 | 112 |
| 0.4–0.5 | 45 | 1.4–1.5 | 73 | 2.4–2.5 | 92 | 3.4–3.5 | 104 | 4.4–4.5 | 112 |
| 0.5–0.6 | 48 | 1.5–1.6 | 75 | 2.5–2.6 | 94 | 3.5–3.6 | 105 | 4.5–4.6 | 113 |
| 0.6–0.7 | 52 | 1.6–1.7 | 77 | 2.6–2.7 | 95 | 3.6–3.1 | 105 | 4.6–4.7 | 113 |
| 0.7–0.8 | 54 | 1.7–1.8 | 80 | 2.7–2.8 | 97 | 3.7–3.8 | 106 | 4.7–4.8 | 114 |
| 0.8–0.9 | 57 | 1.8–1.9 | 82 | 2.8–2.9 | 98 | 3.8–3.9 | 107 | 4.8–4.9 | 114 |
| 0.9–1.0 | 60 | 1.9–2.0 | 84 | 2.9–3.0 | 100 | 3.9–4.0 | 108 | 4.9–5.0 | 115 |

11. The apparatus for precipitating sulfur out of water containing hydrogen sulfide defined in claim 1, further comprising means within said pressure vessel for straining the precipitated solid sulfur particles from the potable water before the potable water passes through said outlet.

12. The apparatus for precipitating sulfur out of water containing hydrogen sulfide defined in claim 6, further comprising a strainer on said outlet riser within said closed tank for preventing precipitated solid sulfur particles from entering said outlet riser.

13. The apparatus for precipitating sulfur out of water containing hydrogen sulfide defined in claim 9, further comprising a strainer on said treated water outlet within said pressure vessel for preventing precipitated sulfur particles from entering said outlet and flowing from said pressure vessel through said outlet.

14. Apparatus for producing potable water by removing hydrogen sulfide from the water by precipitating and settling solid sulfur particles in the water without filtration of the precipitated solid particles, comprising means for injecting air into the hydrogen sulfide containing water so as to mix and dissolve sufficient oxygen in the hydrogen sulfide containing water to saturate the water with oxygen;

means for raising the pressure of the hydrogen sulfide containing water and dissolved oxygen mixture to a pressure at which sulfur precipitates;

means for maintaining the hydrogen sulfide containing water and dissolved oxygen mixture at said pressure for sufficient time to cause the all of the sulfur in said water to precipitate as solid sulfur particles;

means for settling the precipitated sulfur particles downwardly through a non-turbulent quiescent zone;

means for removing the settled precipitated solid sulfur particles from the water at a location below the non-turbulent quiescent zone; and means for recovering treated sulfur free potable water from a location vertically above said non-turbulent quiescent zone.

15. Apparatus for producing potable water by removing hydrogen sulfide from the water defined in claim 14, further comprising means for straining said precipitated sulfur particles from said water at said location vertically above said non-turbulent quiescent zone.

16. Apparatus for producing potable water by removing hydrogen sulfide from the water defined in claim 14, comprising means for injecting sufficient air into the hydrogen sulfide containing water to raise the dissolved oxygen level in the hydrogen sulfide containing water to at least about 6 ppm, means for raising and maintaining the pressure of the hydrogen sulfide containing water and dissolved oxygen mixture to a pressure that never falls below about 55 psi, and means for maintaining the hydrogen sulfide containing water and dissolved oxygen mixture at said pressure that never falls below 55 psi for at least about a minimum period of time selected from the following table for the indicated hydrogen sulfide levels:

| H2S (ppm) | Time (min) | H2S (ppm) | Time (min) | H2S (ppm) | Time (min) | H2S (ppm) | Time (min) | H2S (ppm) | Time (min) |
|---|---|---|---|---|---|---|---|---|---|
| 0.0–0.1 | 6 | 1.0–1.1 | 63 | 2.0–2.1 | 86 | 3.0–3.1 | 101 | 4.0–4.1 | 109 |
| 0.1–0.2 | 25 | 1.1–1.2 | 65 | 2.1–2.2 | 87 | 3.1–3.2 | 102 | 4.1–4.2 | 110 |
| 0.2–0.3 | 35 | 1.2–1.3 | 68 | 2.2–2.3 | 88 | 3.2–3.3 | 103 | 4.2–4.3 | 111 |
| 0.3–0.4 | 40 | 1.3–1.4 | 70 | 2.3–2.4 | 90 | 3.3–3.4 | 104 | 4.3–4.4 | 112 |
| 0.4–0.5 | 45 | 1.4–1.5 | 73 | 2.4–2.5 | 92 | 3.4–3.5 | 104 | 4.4–4.5 | 112 |
| 0.5–0.6 | 48 | 1.5–1.6 | 75 | 2.5–2.6 | 94 | 3.5–3.6 | 105 | 4.5–4.6 | 113 |
| 0.6–0.7 | 52 | 1.6–1.7 | 77 | 2.6–2.7 | 95 | 3.6–3.7 | 105 | 4.6–4.7 | 113 |
| 0.7–0.8 | 54 | 1.7–1.8 | 80 | 2.7–2.8 | 97 | 3.7–3.8 | 106 | 4.7–4.8 | 114 |
| 0.8–0.9 | 57 | 1.8–1.9 | 82 | 2.8–2.9 | 98 | 3.8–3.9 | 107 | 4.8–4.9 | 114 |
| 0.9–1.0 | 60 | 1.9–2.0 | 84 | 2.9–3.0 | 100 | 3.9–4.0 | 108 | 4.9–5.0 | 115 |

17. Apparatus for producing potable water by removing hydrogen sulfide from the water defined in claim 14, further comprising a closed pressurized tank, means for flowing the hydrogen sulfide containing water and dissolved oxygen mixture into said closed tank so as to create a turbulent mixing zone in the tank adjacent the upper level of the liquid in the tank; means providing a non-turbulent quiescent liquid settling zone adjacent the bottom of said tank for sulfur particles that have precipitated in said turbulent mixing zone; means in said tank for straining precipitated sulfur particles and withdrawing the strained water that is free of hydrogen sulfide and free of precipitated sulfur particles from said tank at said level vertically above said non-turbulent quiescent liquid settling zone; and means for flushing the precipitated particles of sulfur out of said tank at said tank bottom.

18. Apparatus producing potable water by removing hydrogen sulfide from the water as defined in claim 17, further comprising an inlet riser connected to a tank inlet and extending upwardly into about the center of said closed tank for creating said turbulent mixing zone adjacent the center of said closed tank where the mixture enters said closed tank, an outlet riser and a strainer on said outlet riser for preventing precipitated solid sulfur particles from exiting said tank with said potable water, said outlet riser being spaced vertically above a drain hole in the bottom of said closed tank a distance sufficient to create said non-turbulent quiescent zone through which precipitated solid sulfur particles settle toward said drain hole, said means for maintaining said mixture in said closed tank comprising an air level float control valve having a drop pipe extending downwardly from the top of said closed tank into said closed tank so as to expel compressed air from said closed tank when the level of the water containing hydrogen sulfide and dissolved oxygen mixture in said closed tank falls below a predetermined minimum level, and said inlet riser and said air level control valve drop pipe being vertically offset from each other adjacent the center of said closed tank.

19. Apparatus producing potable water by removing hydrogen sulfide from the water by precipitating and settling solid sulfur particles from the water without filtration of precipitated solid particles, comprising:

a pressure tank having an inlet for water containing hydrogen sulfide, an outlet for potable water free form hydrogen sulfide and solid sulfur particles and a drain hole for removing settled solids to waste;

a pump for flowing pressurized water containing hydrogen sulfide into said inlet and a venturi nozzle having its inlet connected to the outlet side of said pump and its outlet connected to said inlet of said pressure tank for injecting sufficient air into the hydrogen sulfide containing water in said tank so as to mix and dissolve at least 6 ppm of oxygen in the hydrogen sulfide containing water and thereby to saturate the water with oxygen, said pump being connected to said inlet for raising the pressure of the hydrogen sulfide containing water and dissolved oxygen mixture in said tank to a pressure that never falls below 55 psi;

means for maintaining the hydrogen sulfide containing water and dissolved oxygen mixture in said tank at said pressure that never falls below 55 psi for at least about a minimum period of time selected from the following table for the indicated hydrogen sulfide levels:

| H2S (ppm) | Time (min) | H2S (ppm) | Time (min) | H2S (ppm) | Time (min) | H2S (ppm) | Time (min) | H2S (ppm) | Time (min) |
|---|---|---|---|---|---|---|---|---|---|
| 0.0–0.1 | 6 | 1.0–1.1 | 63 | 2.0–2.1 | 86 | 3.0–3.1 | 101 | 4.0–4.1 | 109 |
| 0.1–0.2 | 25 | 1.1–1.2 | 65 | 2.1–2.2 | 87 | 3.1–3.2 | 102 | 4.1–4.2 | 110 |
| 0.2–0.3 | 35 | 1.2–1.3 | 68 | 2.2–2.3 | 88 | 3.2–3.3 | 103 | 4.2–4.3 | 111 |
| 0.3–0.4 | 40 | 1.3–1.4 | 70 | 2.3–2.4 | 90 | 3.3–3.4 | 104 | 4.3–4.4 | 112 |
| 0.4–0.5 | 45 | 1.4–1.5 | 73 | 2.4–2.5 | 92 | 3.4–3.5 | 104 | 4.4–4.5 | 112 |
| 0.5–0.6 | 48 | 1.5–1.6 | 75 | 2.5–2.6 | 94 | 3.5–3.6 | 105 | 4.5–4.6 | 113 |
| 0.6–0.7 | 52 | 1.6–1.7 | 77 | 2.6–2.7 | 95 | 3.6–3.7 | 105 | 4.6–4.7 | 113 |
| 0.7–0.8 | 54 | 1.7–1.8 | 80 | 2.7–2.8 | 97 | 3.7–3.8 | 106 | 4.7–4.8 | 114 |
| 0.8–0.9 | 57 | 1.8–1.9 | 82 | 2.8–2.9 | 98 | 3.8–3.9 | 107 | 4.8–4.9 | 114 |
| 0.9–1.0 | 60 | 1.9–2.0 | 84 | 2.9–3.0 | 100 | 3.9–4.0 | 108 | 4.9–5.0 | 115; | means creating a non-turbulent quiescent zone in said tank;

means for settling precipitated solid sulfur particles downwardly through said non-turbulent quiescent zone to the bottom of said tank;

means for flushing the settled precipitated solid sulfur particles out of the bottom of said tank through said drain hole; and a vertical stand pipe connected to said outlet for potable water for recovering treated sulfur free potable water from a location vertically above said drain hole; and means in said pressure tank for straining precipitated solid sulfur particles from the potable water entering said stand pipe.

20. Apparatus producing potable water by removing hydrogen sulfide from the water as defined in claim 19, further comprising an inlet riser connected to said inlet and extending upwardly into about the center of said tank for creating said turbulent mixing zone adjacent the center of said tank where the mixture enters said tank, a strainer on said outlet riser for preventing precipitated solid sulfur particles from exiting said tank with said potable water, said outlet riser being spaced vertically above said drain hole a distance sufficient to create said non-turbulent quiescent zone through which precipitated solid sulfur particles settle toward said drain hole.

21. Apparatus producing potable water by removing hydrogen sulfide from the water as defined in claim 19, further comprising said means for maintaining said mixture in said tank comprising an air level float control valve having a drop pipe that extends downwardly into said tank from the top of said tank so as to expel compressed air from said tank when the level of the water containing hydrogen sulfide and dissolved oxygen mixture in said tank falls below a predetermined minimum level, and said inlet riser and said air level control valve drop pipe being vertically offset from each other adjacent the center of said tank.

* * * * *